United States Patent [19]

Snyder

[11] Patent Number: 5,202,741
[45] Date of Patent: Apr. 13, 1993

[54] ACTIVE IMAGING SYSTEM WITH FARADAY FILTER

[75] Inventor: James J. Snyder, San Jose, Calif.

[73] Assignee: The United States of America as represented by the Department of Energy, Washington, D.C.

[21] Appl. No.: 905,989

[22] Filed: Jun. 29, 1992

[51] Int. Cl.$^5$ .............................. G01C 3/08
[52] U.S. Cl. .............................. 356/4; 356/5; 250/330
[58] Field of Search .............. 356/4, 5, 28, 28.5; 250/330, 332

[56] References Cited

U.S. PATENT DOCUMENTS

| 4,963,024 | 10/1990 | Ulich ..................... 356/342 |
| 4,964,721 | 10/1990 | Ulich et al. ............... 356/5 |
| 5,013,917 | 5/1991 | Ulich ..................... 250/330 |

Primary Examiner—Mark Hellner
Attorney, Agent, or Firm—Henry P. Sartorio; Roger S. Gaither; William R. Moser

[57] ABSTRACT

An active imaging system has a low to medium powered laser transmitter and a receiver wherein the receiver includes a Faraday filter with an ultranarrow optical bandpass and a bare (nonintensified) CCD camera. The laser is locked in the vicinity of the passband of the Faraday filter. The system has high sensitivity to the laser illumination while eliminating solar background.

20 Claims, 3 Drawing Sheets

ACTIVE IMAGING SYSTEM WITH FARADAY FILTER

The United States government has rights in this invention pursuant to Contract Number W-7405-ENG-48 between the United States Department of Energy and the University of California for the operation of Lawrence Livermore National Laboratory.

BACKGROUND OF THE INVENTION

1. Field of the Invention

The present invention relates to active imaging systems in general and in particular to an active imaging system comprising a laser transmitter and an optical receiver wherein the receiver comprises a Faraday filter and a bare (non-intensified) CCD camera.

2. Description of Related Art

Radar has long been used for precision tracking of objects in space. However, in certain circumstances the use of radar for this purpose is found to have a number of disadvantages. For example, the resolution of a given radar is a function of its wavelength. As the wavelength is shortened the resolution is increased. Thus to increase the resolution of a radar beyond that achieved heretofore, the use of lasers to illuminate, image and track targets has been proposed as an alternative.

Heretofore, proposals for active imaging with lasers in space have in general comprised the use of a laser in combination with a dielectric optical filter and an intensified CCD camera. Among the disadvantages of such systems is the fact that dielectric optical filters are, with respect to the bandwidth of a laser at its operating frequency, relatively broadband devices and that intensified CCD cameras have a rather low quantum efficiency, e.g. 10%, compared to 80% or 90% for bare (unintensified) CCD sensors. The justification for using the dielectric optical filter and the intensified CCD is that the intensified CCD can be gated to reduce the frame integration time of the CCD down to a small number of nanoseconds, e.g. 10-30 nanoseconds, and thereby suppress the background of the sunlit earth, oceans, clouds, etc. However, this approach in turn requires that the illuminating laser be pulsed and operated in the visible region of the spectrum. For long range imaging, the only pulsed visible laser with sufficient power, e.g. 1.7 kilowatts (kw), to provide the required target irradiance is the frequency-doubled, Q-switched neodymium-doped yttrium aluminum garnet (Nd:YAG) laser operating at 532 nanometers (nm).

SUMMARY OF THE INVENTION

In view of the foregoing, principal objects of the present invention are a method and apparatus comprising a novel active imaging system having a relatively low power laser transmitter and a receiver. The laser power in the transmitter is in the range of 10 to 50 watts depending on the desired size of the beam spot on the target. The receiver comprises a bare CCD camera for receiving an image of the target through a Faraday filter.

The preferred laser in the transmitter is a moderate power, e.g. 10 watt to 50 watt, laser, such as a titanium-doped sapphire (Ti:Al$_2$O$_3$) (Ti:sapphire), that operates in the visible to near-infrared because CCD quantum efficiency is highest at those frequencies. A laser of this type was developed at the Lawrence Livermore National Laboratory and has been disclosed and discussed in a paper entitled 43 Watt CW Ti:Sapphire Laser, G. V. Erbert et al, presented at the 1991 Conference on Lasers and Electro-Optics in Baltimore, Md.

Faraday filters, which have been known for many years and which are disclosed and discussed in articles entitled Dispersive magnetooptic filters, Pochi Yeh, Applied Optics, Vol. 21, No. 11, Jun. 1, 1982, Ultrahigh-noise rejection optical filter, D. J. Dick and T. M. Shay, Optics Letters, Vol. 16, No. 11, Jun. 1, 1991 and Long-range, noncoherent laser Doppler velocimeter, S. H. Bloom, Optics Letters, Vol. 16, No. 22, Nov. 15, 1991, provide ultra-narrow optical bandwidths of the order of a few GHz, off-band rejection of $10^5$, throughput exceeding 50%, and the ability to transmit images. They utilize the anomalous dispersion of an atomic absorption line in the presence of an axial magnetic field, and are therefore available at numerous wavelengths throughout the optical spectrum. For example, a Faraday filter using the cesium resonant line at 852 nm comprises a cell heated to about 120 degrees Celsius (C) and a magnetic field of around 100 gauss.

In a receiver according to the present invention a Faraday filter as described above is provided in the optical train preceding the CCD camera. In the transmitter, a second Faraday filter can be used as a reference for locking the diode laser frequency to or near the 852 nm cesium resonant line.

Although the laser illumination is preferably cw in most applications, the Faraday filter allows the use of pulsed or modulated operation if desired for ranging applications. In addition, the Faraday filter can be gated or it can be tuned by electronic control of the magnetic field for applications such as Doppler radar.

In a preferred embodiment of the present invention the laser comprises a single frequency and a single transverse mode such that the combination provides from 10 watts to 50 watts of optical power in a diffraction limited circular beam.

A first order radiometric analysis of a system according to the present invention, assuming an illuminator spot diameter of 10 meters (m) showed that 50 watts of illuminator power leads to a signal-to-noise ratio of 10. This is more than sufficient to satisfy typical active tracking and pointing system requirements.

For comparison purposes, an analysis of a similar illuminator system based on a frequency doubled YAG laser and an intensified CCD was conducted. From the analysis it was evident that the major advantage of the system of the present invention and its ability to use a low powered laser illuminator is due to the high quantum efficiency, e.g. 80%, of the bare CCD camera in comparison with the intensified CCD (estimated at 10%). Since the major reason for using the intensifier is to reduce background by low duty cycle gating, it is clear that the critical new component enabling the use of a low powered laser is the narrow band Faraday filter.

The Faraday filter provides other advantages. For example, by allowing the use of a continuous wave (CW) laser to track a moving target the problem of speckle, which is a consequence of the reflection of coherent light from a rough surface, is reduced due to the inherent time averaging of the image by the CCD camera.

Another advantage of the Faraday filter is that the Faraday filter allows operation at a longer wavelength, e.g. 852 nanometers (nm), than is possible with an intensified CCD camera and that at the longer wavelength, the system sensitivity is increased by a factor which is approximately equal to the cube of the ratio of the longer wavelength to the shorter wavelength, e.g. 4.1.

Thus, between the increased quantum efficiency of the bare CCD camera (by a factor of 8) and the increased system sensitivity (by a factor of 4) when operating at a longer wavelength than was possible in prior known systems, the system of the present invention requires from 30 to 35 times less power than the prior known systems.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Figure 1:
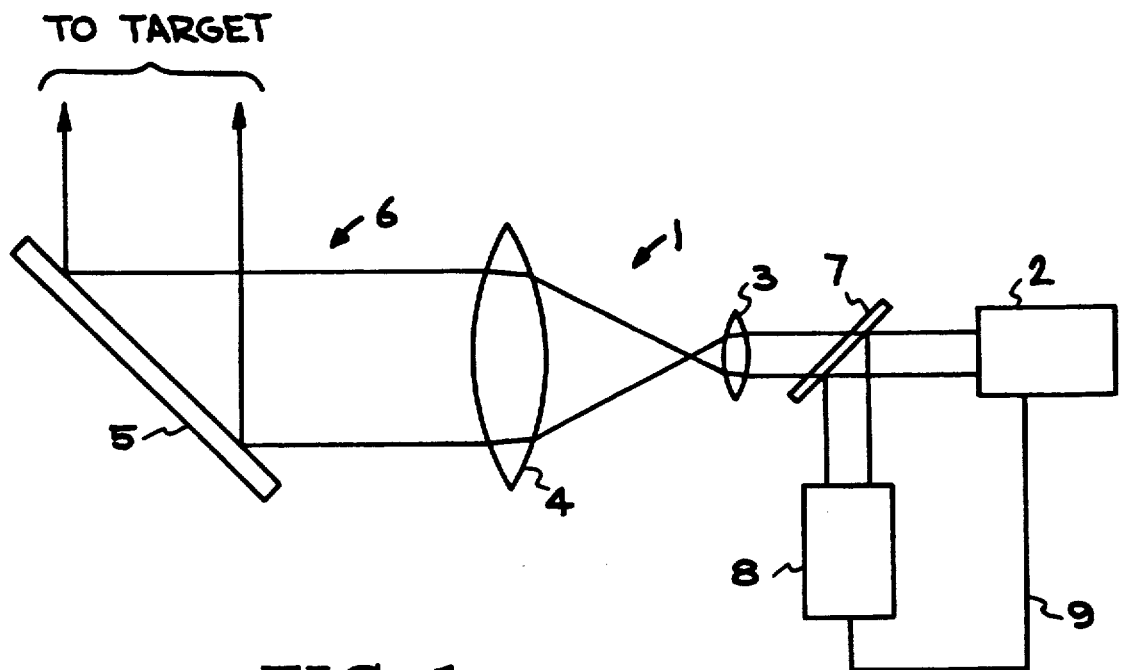
FIG. 1 is a schematic diagram of a laser transmitter according to the present invention.

Referring to FIG. 1, there is provided in accordance with the present invention a laser illuminator/transmitter designated generally as 1 comprising a laser 2, a first lens 3, a second lens 4 and a steering mirror 5. A beam splitter 7 between laser 2 and lens 3 inputs a portion of the laser output into a Faraday filter 8 which is coupled to the laser 2 by means of a feedback signal line 9. The filter 8 and line 9 are provided to lock the wavelength of the laser 2 to or near the center wavelength of the filter 8 in any well known manner. The purpose of locking the wavelength of laser 2 will be further described with reference to FIG. 3.

The laser 2 can be a Ti:Sapphire laser or any other laser device or apparatus that outputs radiation at the visible to near infrared wavelengths at which Faraday filters operate such as, for example, 852 nanometers (nm). These wavelengths are chosen because the quantum efficiency of charge couple device (CCD) cameras is highest at these wavelengths. The power output of the laser 2 depends on the required/desired spot size on the target. For example, a first order radiometric analysis of the system according to the present invention, assuming an illuminator spot diameter of 10 meters on the target, showed that 50 watts of illuminator power leads to a signal-to-noise ratio of 10, that is more than sufficient to satisfy typical active tracking and pointing system requirements.

The lenses 3 and 4 in conjunction with the steering mirror 5 are used in a conventional manner to direct the laser radiation designated generally by 6 to a target (not shown) which may be several hundred kilometers away. The invention is generally directed to long range applications, e.g. where the target is at a distance of greater than about one kilometer.

Figure 2:
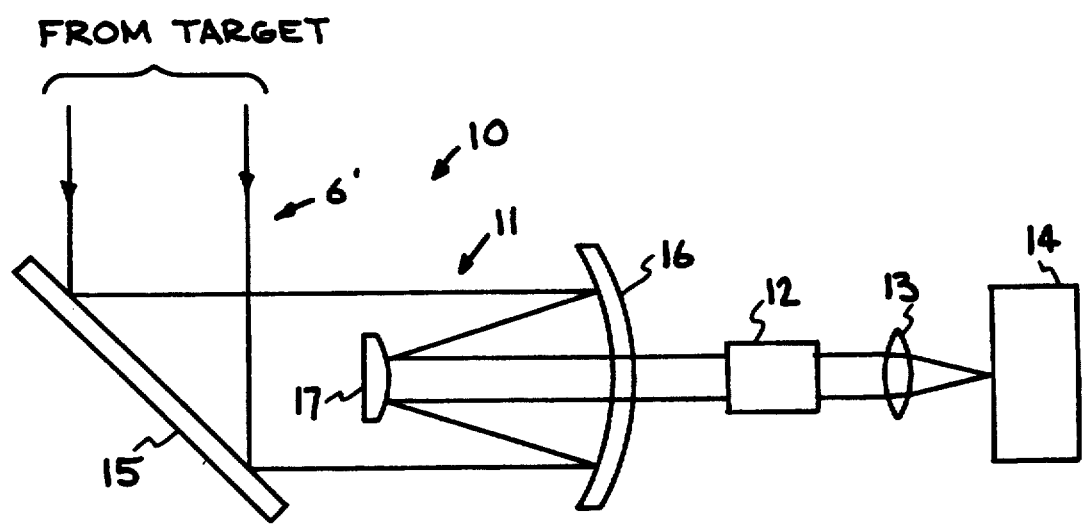
FIG. 2 is a schematic diagram of an optical receiver according to the present invention.

Referring to FIG. 2, there is provided in accordance with the present invention an optical receiver designated generally as 10. In the receiver 10 there is provided a telescope designated generally as 11, such as a Cassegrainian telescope, a Faraday filter 12, a lens 13 and a bare (nonintensified) CCD camera 14. In the telescope 11 there is provided a steering mirror 15, a concave paraboloidal (primary) mirror 16 and a convex hyperboloidal (secondary) mirror 17 for directing laser light being reflected from the target designated generally as 6' to the input of the Faraday filter 12. The output of the Faraday filter is focused by means of the lens 13 on the image plane of the CCD camera 14.

As described above, the use of the Faraday filter with its ultra-narrow bandwidth on the order of a few gigaHertz (GHz), offband rejection of $10^5$, throughput of 70% and the ability to transmit images allows the use of the bare (nonintensified) CCD camera 14 and at longer wavelengths (852 nm) than heretofore possible using prior known intensified CCD cameras. The bare CCD sensor at 852 nm can have a quantum efficiency as high as 80% or eight times the quantum efficiency of an intensified CCD at 532 nm. Furthermore, as described above, the increased system sensitivity at the longer wavelengths plus the increased quantum efficiency allows for a significant reduction in the required illuminator power. For example, an active imaging system based on a pulsed 532 nm laser and a gated image intensifier requires about 35 times the illuminator power of a system based on a CW 852 nm laser and an ultra-narrow band Faraday filter as provided in the present invention.

In an alternative embodiment to the present invention, the relative positions of the filter 12 and lens 13 in the optical path can be reversed.

Figure 3:
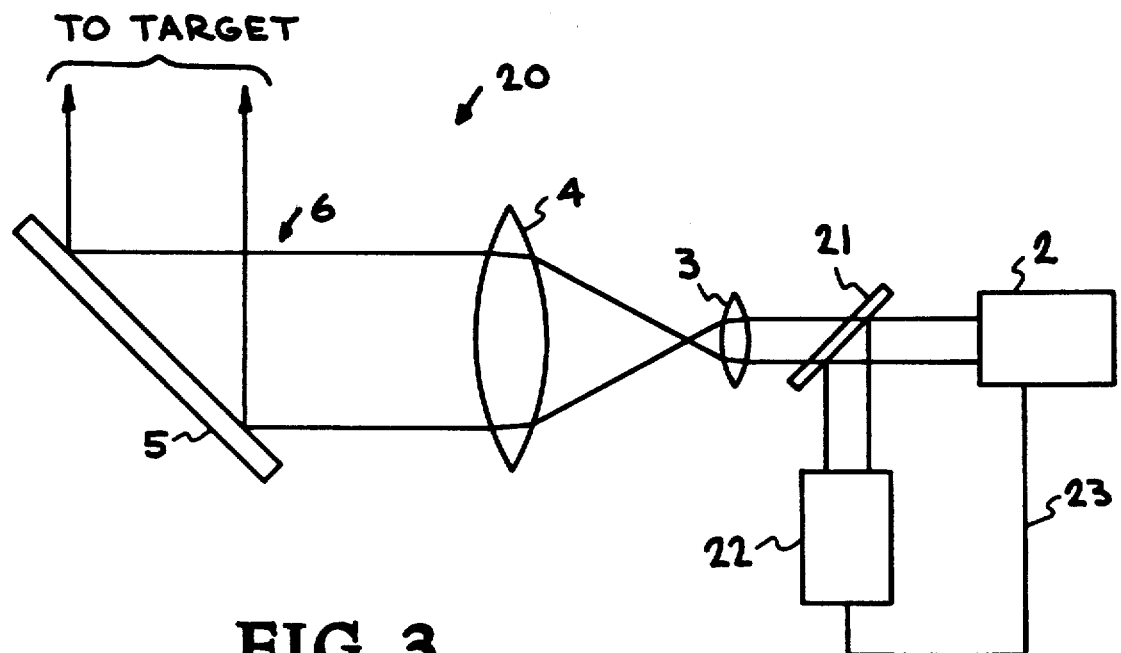
FIG. 3 is a schematic diagram of an alternative laser transmitter according to the present invention.

Referring to FIG. 3, there is provided in an alternative embodiment of the present invention a transmitter designated generally as 20 which comprises the laser 2, the first and second lens 3, 4 and the steering mirror 5 of the apparatus of FIG. 1. In addition to these components, there is provided in the transmitter 20 a beam splitter 21 and a reference cesium absorption cell 22 which is coupled to the laser 2 by means of a feedback signal line 23. The cell 22 and feedback signal line 23 like the filter 8 and line 9 of FIG. 1, are provided for locking the wavelength of the laser 2 at a predetermined wavelength which may be at or near 852 nm. A reason for locking the laser 2 to a wavelength other than 852 nm when the Faraday filter 12 in the receiver 10 is centered at 852 nm is to allow for Doppler shifts in the wavelength of the return signal due to a moving target which could fall outside the passband of the filter 12 if the laser wavelength was centered in the filter passband.

Figure 4:
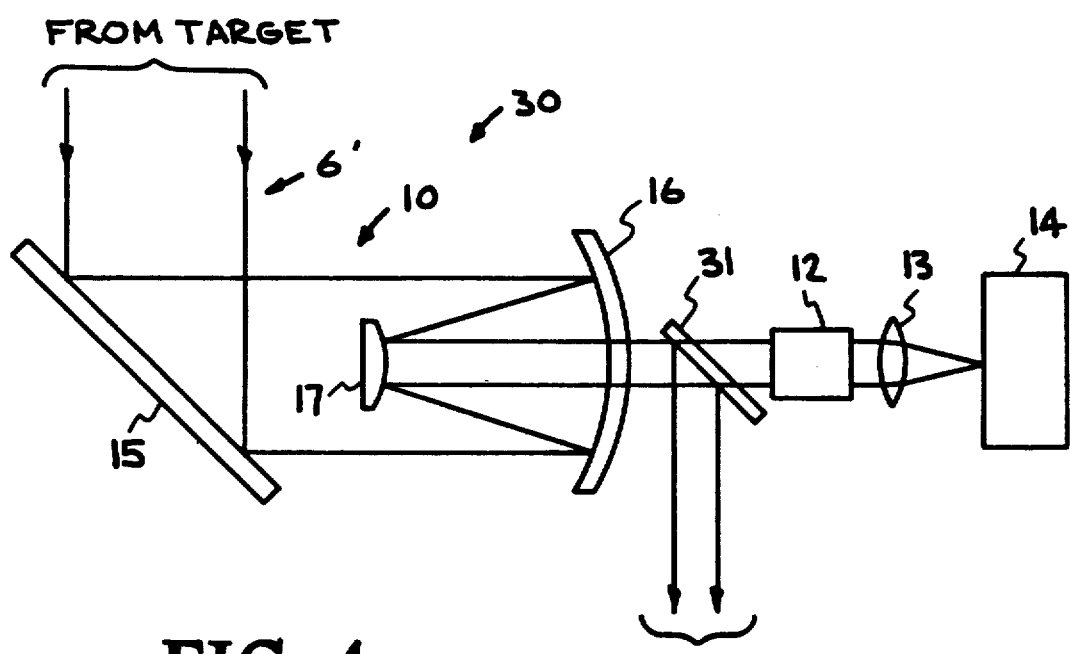
FIG. 4 is a schematic diagram of an alternative embodiment of an optical receiver according to the present invention.

Referring to FIG. 4, there is provided in an alternative embodiment of the present invention a receiver designated generally as 30. In the receiver 30 there is provided the telescope 10 comprising the mirrors 15, 16 and 17, the Faraday filter 12, the lens 13 and the bare (nonintensified) CCD camera 14 as described above with respect to the receiver 10 of FIG. 2. In addition to these components there is provided a beam splitter 31. In one embodiment of the present invention, the beam splitter 31 comprises a dichroic beam splitter for splitting the beam 6' being received from a target. The dichroic beam splitter 31 directs light 6' centered at 852 nm to the Faraday filter 12, and directs other wavelengths of the beam 6' to other sensors (not shown).

Figure 5:
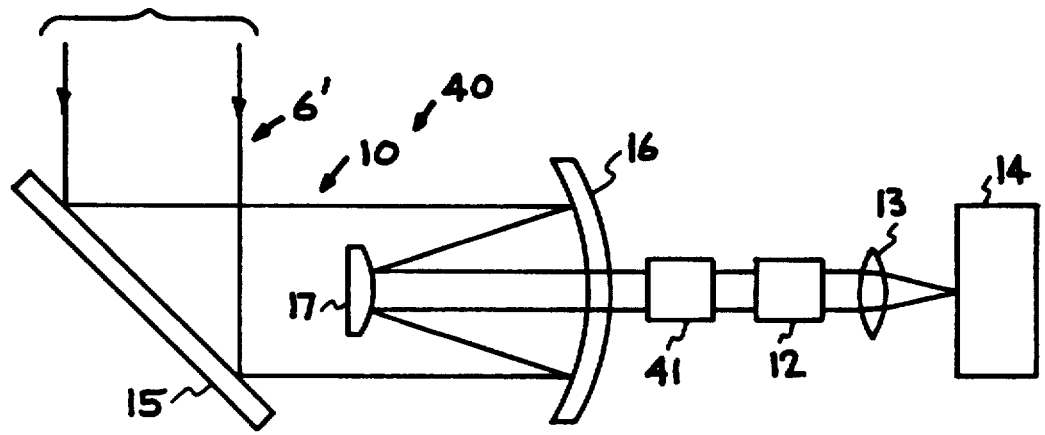
FIG. 5 is a schematic diagram of another alternative embodiment of an optical receiver according to the present invention.

Referring to FIG. 5, there is provided in another embodiment of the present invention a receiver designated generally as 40. In the receiver 40 there is provided a telescope 10 comprising the mirrors 15, 16 and 17, the Faraday filter 12, the lens 13 and the CCD camera 14 described above with respect to the receivers 10 and 30 of FIGS. 2 and 4. In addition to these components there is provided in place of the dichroic beam splitter 31 of FIG. 4 a dielectric bandpass filter 41. The dielectric bandpass filter 41 preferably has a bandwidth of no more than 100 nm and has a center frequency of 852 nm. While the Faraday filter is an ultra-narrow band device, the attenuation of the signals outside the bandwidth of the Faraday filter is improved by using the dielectric bandpass filter as described above.

Figure 6:
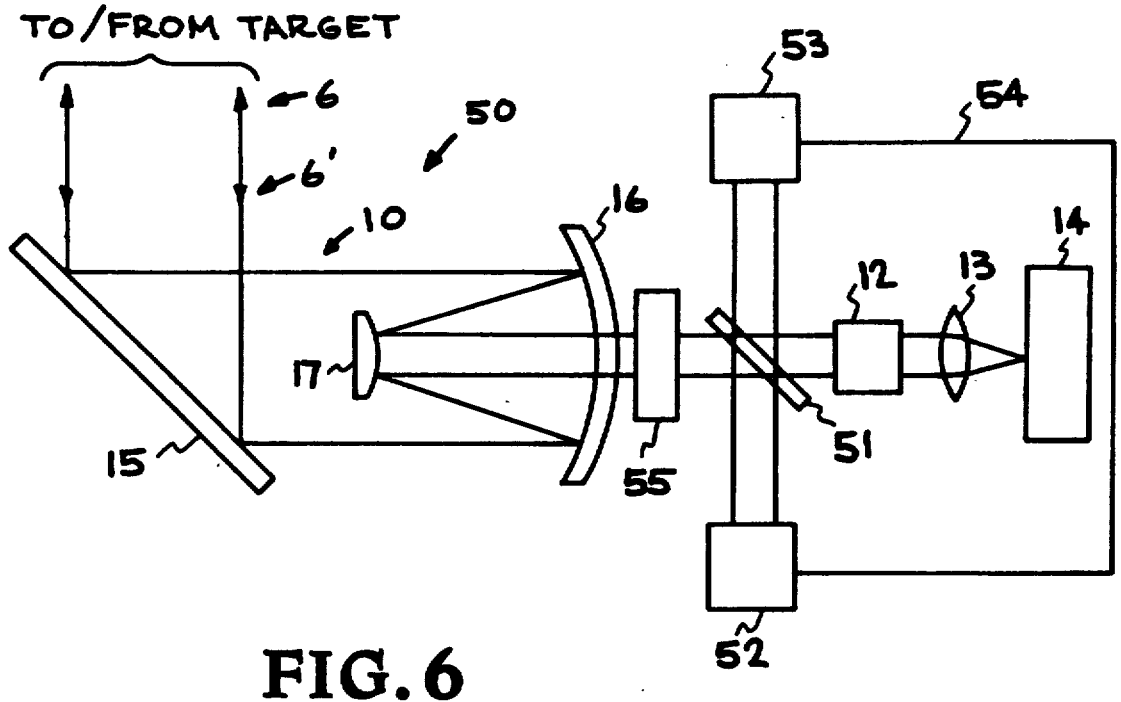
FIG. 6 is a schematic diagram of a combined laser transmitter and optical receiver according to the present invention.

Referring to FIG. 6, there is shown in still another embodiment of the present invention an optical transmitter-receiver designated generally as 50. In the transmitter-receiver 50 there is provided the telescope 10 comprising the mirrors 15, 16 and 17, the Faraday filter 12, the lens 13 and the bare CCD camera 14 as described above with respect to the receivers 10, 30 and 40 of FIGS. 2, 4 and 5. In addition to these components, there is provided in the embodiment of FIG. 6 a beam splitter 51, e.g. 50—50 beam splitter, for transmitting laser light from a laser 52 to a distant target by means of the telescope 10, a reference filter or cell 53, such as the filter 8 of FIG. 1 or the cell 22 of FIG. 3 and a feedback signal line 54 for locking the wavelength of the laser 52 to approximately the center wavelength of the filter or cell 53. The laser 52 may comprise any suitable laser capable of providing light in the visible to near infrared wavelengths as described above with respect to the laser 2 of FIGS. 1 and 3.

In the simplest embodiment of FIG. 6, beam splitter 51 is a 50—50 beam splitter so that half the laser output is transmitted to the target and half to cell or filter 53. Half the light returning from the target is then incident on Faraday filter 12 and CCD 14. Although only a small amount of the laser light is required to actuate cell or filter 53, the beam splitter 51 cannot be made more highly reflecting without decreasing the amount of light returning from the target which is transmitted to Faraday filter 12. In an alternative embodiment in which the reflectivity of beam splitter 51 can be much greater, e.g. about 98%, so that most of the laser light is sent to the target, the output of laser 52 is linearly polarized, and beam splitter 51 is a high reflectivity polarizing beam splitter which reflects most of the linearly polarized laser light. A polarizer 55, e.g. a quarter wave plate, placed between beam splitter 51 and telescope 10 converts the linear polarization to circular polarization. Since the return light from the target is reverse circular polarized, polarizer 55 will convert the light to linear polarization which is orthogonal to the polarization of the light from laser 52. Beam splitter 51 will thus transmit most of the return signal to Faraday filter 12.

While preferred embodiments of the present invention are described above, it is contemplated that numerous modifications may be made thereto for particular applications without departing from the spirit and scope of the present invention. For example, while the lens 13 is shown located between the Faraday filter 12 and the CCD camera 14, it is possible to locate the lens 13 on the opposite side of the filter 12. Also, other types of telescopes may be used, as can other lasers at other or the same wavelengths with predictable effects on the performance of the system. Accordingly, it is intended that the embodiments described be considered only as illustrative of the present invention and that the scope thereof should not be limited thereto but be determined by reference to the claims hereinafter provided.

What is claimed is:

1. An active imaging system comprising:
   a Faraday filter having a center wavelength in the visible to near infrared;
   means for receiving laser light reflected from a distant target and transmitting said light to said filter; and
   a non-intensified CCD camera for receiving a filtered version of the laser light from the distant target from the filter.

2. An active imaging system according to claim 1 wherein said Faraday filter has a center wavelength of approximately 852 nanometers.

3. An active imaging system according to claim 1 wherein said means for receiving and transmitting laser light reflected from a distant target comprises a telescope means.

4. An active imaging system according to claim 3 wherein said telescope means comprises a steering mirror for steering laser light received from the distant target.

5. An active imaging system according to claim 1 comprising means for providing laser light having a wavelength locked to approximately the center wavelength of the Faraday filter.

6. An active imaging system according to claim 5 wherein said means for providing laser light having a wavelength in the visible to near infrared comprises means for providing laser light having a wavelength of approximately 852 nanometers.

7. An active imaging system according to claim 5 comprising means responsive to laser light from said laser light providing means for controlling the wavelength of the laser light provided by said laser light providing means.

8. An active imaging system according to claim 7 wherein said means for controlling the wavelength of the laser light provided by said laser light providing means comprises a second Faraday filter having a predetermined center wavelength.

9. An active imaging system according to claim 7 wherein said means for controlling the wavelength of the laser light provided by said laser light providing means comprises a cesium absorption filter having a predetermined center wavelength.

10. An active imaging system according to claim 1 comprising means for transmitting a portion of the laser light received from a distant target by said laser light receiving and transmitting means to sensors other than the CCD camera.

11. An active imaging system according to claim 10 wherein said means for transmitting a portion of the laser light received from a distant target by said laser light receiving and transmitting means to sensors other than the CCD camera comprises a dichroic beam splitter.

12. An active imaging system according to claim 1 comprising means for filtering the laser light being transmitted to the Faraday filter from said laser light receiving and transmitting means.

13. An active imaging system according to claim 12 wherein said means for filtering the laser light being transmitted to the Faraday filter from said laser light receiving and transmitting means comprises a dielectric bandpass filter.

14. An active imaging system according to claim 13 wherein said dielectric bandpass filter has a center wavelength substantially equal to the center wavelength of the Faraday filter.

15. An active imaging system according to claim 5 wherein said means for providing laser light having a wavelength in the visible to near infrared comprises:
   a source of laser light; and
   means for transmitting laser light from said source to the distant target through said means for receiving and transmitting laser light reflected from the distant target to said filter.

16. An active imaging system according to claim 15 wherein said means for transmitting laser light from said source to the distant target through said means for receiving and transmitting laser light reflected from the distant target to said filter comprises a beam splitter located between said laser light receiving and transmitting means and said filter.

17. An active imaging system according to claim 16 wherein said beam splitter comprises a 50—50 beam splitter.

18. An active imaging system according to claim 16 wherein the source produces linearly polarized light and the beam splitter is highly reflective to the linearly polarized light from the source and highly transmissive to light with an orthogonal linear polarization, and further comprising a polarizer between the beam splitter and said means for receiving and transmitting laser light which changes the polarization of light reflected from the target to an orthogonal linear polarization of light from the source.

19. An active imaging system according to claim 18 wherein the polarizer is a quarter wave plate.

20. An active imaging system according to claim 1 wherein the imaging system is positioned at least about one kilometer from the target.

* * * * *